March 10, 1959
O. E. HOLLE
2,876,719
SEED PLANTER SHOE
Filed April 4, 1957
2 Sheets-Sheet 1
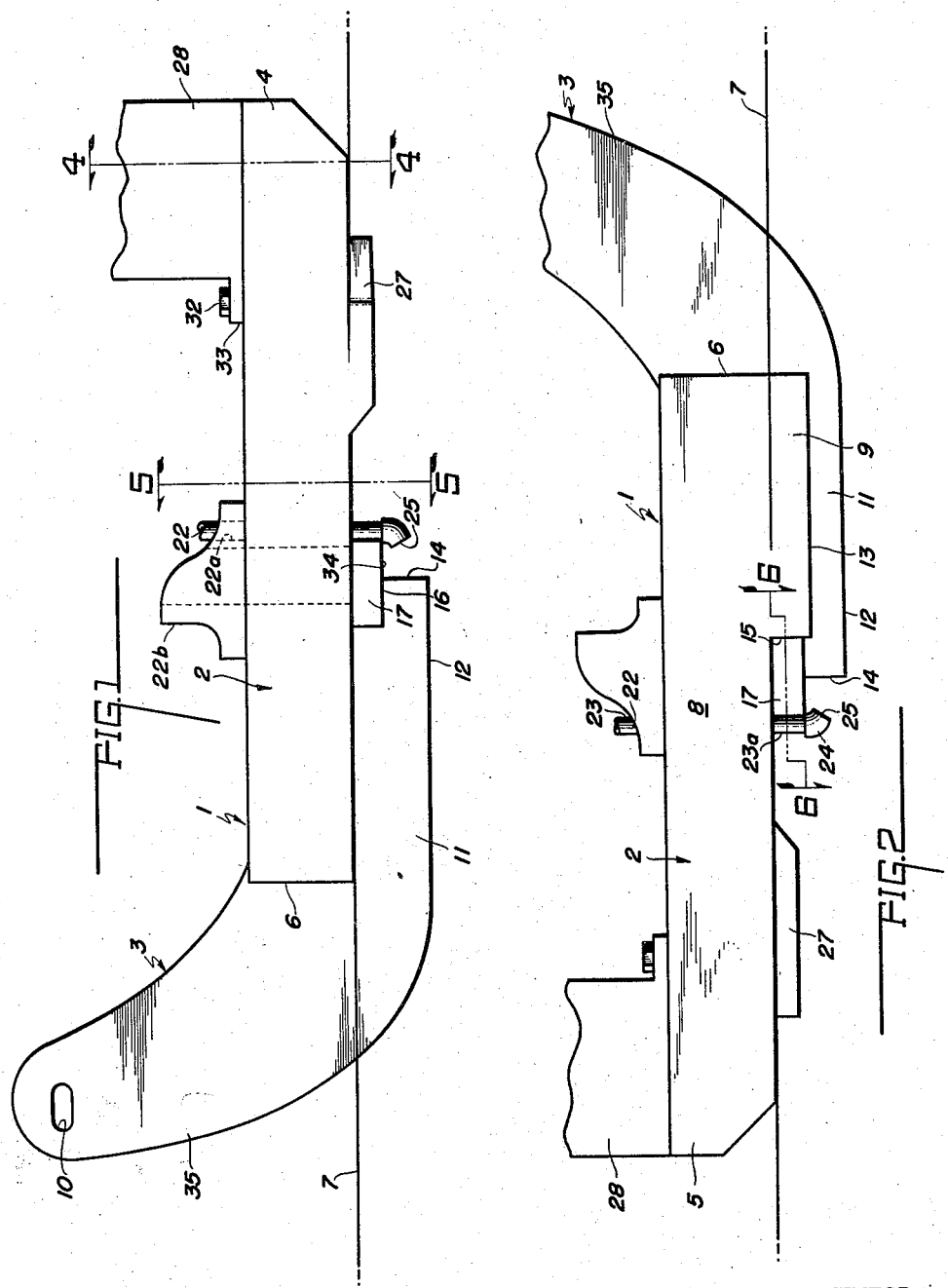
INVENTOR.
OTTO E. HOLLE
BY
George A. Just
ATTORNEY March 10, 1959 — O. E. HOLLE — 2,876,719
SEED PLANTER SHOE
Filed April 4, 1957 — 2 Sheets-Sheet 2
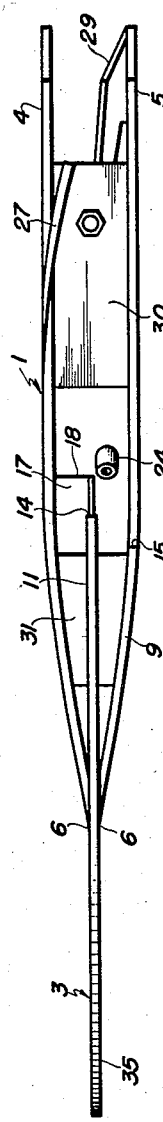
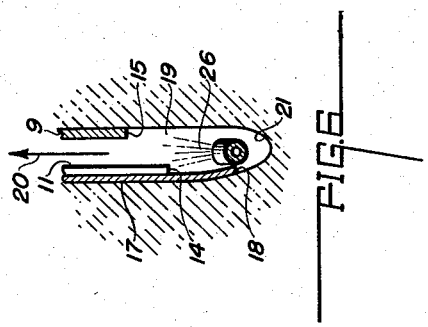
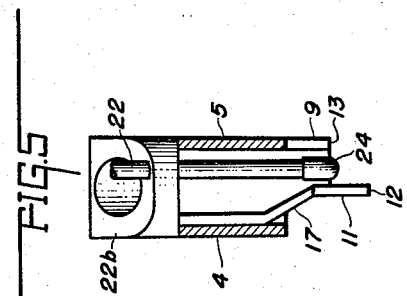
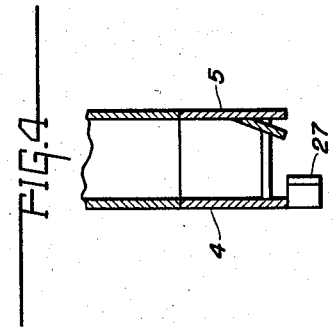
INVENTOR.
OTTO E. HOLLE
BY
*George A. Gust*
ATTORNEY United States Patent Office 2,876,719
Patented Mar. 10, 1959

2,876,719

SEED PLANTER SHOE

Otto E. Holle, Fort Wayne, Ind.

Application April 4, 1957, Serial No. 650,742

2 Claims. (Cl. 111—7)

This invention relates to seed planter shoes of the type which first deposits fertilizer in a furrow in the ground formed by the shoe, then covers the furrow with a thin layer of earth, and lastly sows seed at a shallower level than the fertilizer, and more particularly to a seed planter shoe especially adapted for use with liquid fertilizer.

In the planting of seed, such as corn, seed-planting apparatus has in the past been provided which performed both the operations of fertilizing and seed sowing; such apparatus conventionally includes a shoe which forms a furrow in the ground and deposits the fertilizer and seed in the desired relationship. My Patent No. 2,164,066 issued June 27, 1939 discloses seed-planting apparatus and a shoe therefor which deposits fertilizer below the seed. My Patent No. 2,769,412 issued November 6, 1956 discloses an improved form of seed-planter shoe which first forms a narrow furrow into which the fertilizer is deposited, then covers the furrow with a thin layer of earth, and lastly sows the seed over the thin layer of earth or at one side thereof.

The seed-planting apparatus in use heretofore has been intended for use with the commonly available powdered forms of fertilizer. Fertilizer in liquid form has, however, recently been developed and has been found to be advantageous under certain conditions. It is therefore desirable to use liquid fertilizer in seed-planting apparatus of the type above described. I have found, however, that when an attempt is made to employ liquid fertilizer in the seed-planting apparatus presently available, such as that described in my patents above referred to, a part of the liquid tends to fall on the earth which has closed the furrow, or on the earth at either side of the furrow, and that there is an accompanying tendency for a mud to be formed which clogs the seed-sowing portion of the planter shoe. It is therefore desirable to provide a seed-planter shoe especially adapted for use with liquid fertilizer which incorporates the desirable features of my previous shoes, but which will not have a tendency toward mud formation.

It is therefore an object of this invention to provide an improved seed-planter shoe especially adapted for use with liquid fertilizer.

Another object of this invention is to provide an improved seed planter shoe for use with liquid fertilizer which avoids the disadvantageous features of prior seed-planter shoes when used with liquid fertilizer.

Further objects and advantages of this invention will become apparent by reference to the following description and the accompanying drawings, and the features of novelty which characterize this invention will be pointed out with particularity in the appended claims.

This invention in its broader aspects provides a seed-planter shoe which forms a narrow, deep furrow in the ground which closes rearwardly of the furrow-forming portions as the shoe moves forwardly, and which incorporates a liquid fertilizer conduit having its exit orifice disposed within the furrow rearwardly of the furrow-forming portions and forwardly of the closure of the furrow so that the fertilizer is deposited directly and solely in the bottom of the furrow.

In the drawings:

Fig. 1 is a side elevational view of my improved seed-planter shoe, taken from the left side;

Fig. 2 is a side elevational view of the seed-planter shoe of Fig. 1 taken from the right side;

Fig. 3 is a bottom view of my improved seed-planter shoe;

Fig. 4 is a cross-sectional view taken along the line 4—4 of Fig. 1;

Fig. 5 is a cross-sectional view taken along the line 5—5 of Fig. 1; and

Fig. 6 is a fragmentary cross-sectional view taken along the line 6—6 of Fig. 2 and showing the mode of operation of my improved seed-planter shoe.

Referring now to the figures of the drawings, my improved seed-planter shoe, generally identified at 1, has a body portion 2 formed of a forwardly extending, vertically arranged runner plate member 3, and a pair of rearwardly extending, generally vertically arranged side plate members 4 and 5. As will be best seen in Fig. 3, side plate members 4 and 5 are spaced apart at their rearmost extremities and merge forwardly to join the opposite sides of runner plate 3; side plate members 4 and 5 may be integrally joined to runner plate 3 in any suitable manner, for example, by welding as at 6.

Side plate member 4 is arranged to be disposed substantially above the ground level 7 while side plate member 5 has a first portion 8 arranged to be disposed substantially above ground level and a depending portion 9 arranged to be disposed below ground level; depending portion 9 extends rearwardly from the point of junction 6 of side plate member 5 with runner plate 3. Runner plate member 3 has a forwardly extending portion 35 also disposed above ground with a suitable opening 10 formed at its forward extremity for connecting shoe 1 to the seed planting apparatus (not shown). Runner plate 3 also extends rearwardly intermediate side plate members 4 and 5, as best seen in Fig. 3, and which has a depending portion 11 arranged to be disposed below the ground level 7, the bottom edge 12 of runner plate portion 11 extends deeper than bottom edge 13 of depending portion 9 of side plate 5, and its rear edge 14 extends further rearwardly than the rear edge 15 of depending portion 9.

Portion 11 of the runner plate 3 is stepped, as at 16, adjacent its rear edge 14, and a furrow-forming member 17 is positioned in step 16 and extends between runner plate portion 11 and side plate member 4, as best seen in Figs. 3 and 5. Furrow-forming member 17 has its rear edge 18 extending still further rearwardly of rear edge 14 of runner plate portion 11 and is preferably curved slightly toward side plate member 5, as best seen in Fig. 3. Deflecting member 17 may be integrally joined to portion 11 and side plate member 4 in any suitable manner, as by welding. Reference to Fig. 6 will now show that the arrangement of runner plate portion 11, member 17 and depending portion 9 cause a narrow, deep furrow 19 to be formed in the ground as the shoe 1 is moved forwardly in the direction of arrow 20, which furrow closes rearwardly of portions 9 and 11, and member 17, as at 21, by the earth falling back into the furrow. Also, the member 17 deflects dry fertilizer (if used) to one side of the furrow, which fertilizer is fed to the furrow via the passage in tube 22b.

In order to deposit liquid fertilizer in what I have discovered to be the suitable location in the bottom of furrow 19 rearwardly of the furrow-forming portions and forwardly of closure 21, I have provided a downwardly extending liquid fertilizer conduit or pipe 22, vertically adjustable, having its upper end 23 adapted to be connected to a suitable liquid fertilizer reservoir (not shown). Referring specifically, to Fig. 5, it will be seen that conduit 22 is transversely disposed in a plane intermediate side plate member 5 and runner plate portion 11, and is slidably mounted in an opening 22a adjacent to the dry fertilizer input tube 22b which is secured to the two side plates 4 and 5. A set screw in the tube 22b may be used for securing the pipe 22 in position when the tube has been properly adjusted. Conduit 22 has its bottom end 23a extending into furrow 19 and preferably has an elbow 24 on the end thereof with its exit orifice 25 positioned intermediate rear edge 18 of deflecting member 17 and rear edge 14 of runner plate portion 11, and in a plane intermediate bottom edges 12 and 13 of runner plate portion 11 and depending portion 9. Elbow 24 is further arranged with exit orifice 25 directed forwardly and downwardly so as to direct the liquid fertilizer directly and solely into the bottom of the furrow 19, as at 26, forwardly of the furrow closure 21. I have found that when the exit orifice 25 of liquid fertilizer conduit 22 is positioned as described above, the liquid fertilizer does not impinge on either the sides of the furrow 19 or the earth which has closed in after the furrow and that the mud-forming tendency of prior shoes is thereby eliminated.

While the furrow 19 will close inherently by earth falling therein immediately rearwardly of member 17, as shown in Fig. 6, I have found it desirable to provide a deflector plate 27 which is secured to side plate 4 in any suitable manner, as by welding, and which depends therefrom below ground level 7 further to insure complete closure of the furrow. Seed, such as corn, is fed downwardly from a suitable reservoir (also not shown) by conduit 28, and is directed to one side of furrow 19 by seed-deflecting plate 29 where it is deposited at a level above the earth which closes furrow 19.

Side plate members 4 and 5 are spaced apart rearwardly by spacing member 30 and are held in the proper assembled relation with portion 11 of runner plate 3 by spacing block 31. Seed-conducting conduit 28 is held in assembled relation at the rear of side plate members 4 and 5 in any suitable manner, as by bolt 32 extending through a suitable opening formed in flange portion 33 at the base of conduit 28 and another suitable opening formed in spacing member 30.

It may be desirable to use dry or granulated fertilizer in combination with water, which may be accomplished by feeding the dry fertilizer into the furrow via the passage in tube 22b and water onto this fertiliber via the pipe 22.

A seed-planter shoe in accordance with this invention has been constructed by the applicant which is nineteen (19) inches long overall with side plate members 4 and 5 being fourteen (14) inches long. Runner plate 3 was formed of three-sixteenth (3/16) inch sheet metal and side plate members 4 and 5 were formed of three-sixteenth (3/16) inch sheet steel. Side plate 4 and portion 8 and side plate member 5 were two and one quarter (2¼) inches wide and depending portion 9 was four and one-half (4½) inches long and one and one-fourth (1¼) inches wide. Side plate members 4 and 5 were spaced apart by one and three-eighths (1⅜) inches at their rear ends. Bottom edge 12 of runner plate portion 11 was disposed five-eighths (⅝) inches longer than bottom edge 13 of depending portion 9 and its rear edge 14 was five-eighths (⅝) inches to the rear of rear edge 15. The bottom edge 34 of furrow forming member 17 was one and one-quarter (1¼) inches above bottom edge 12 and its rear edge 18 three-fourths (¾) inches to the rear of the rear edge 14.

It will now be readily apparent that I have provided an improved seed-planter shoe especially adapted for use with liquid fertilizer and which overcomes the difficulties encountered in attempts to use liquid fertilizer with prior seed-planter shoes, namely formation of mud which clogs the shoe.

While specific dimensions of one embodiment of this invention have been given in the foregoing, it will be understood that these have been given as exemplary only and are not intended to be limitative of the invention. Obviously other dimensions may be used without departing from the scope of this invention.

While I have illustrated and described a specific embodiment of this invention, further modifications and improvements will occur to those skilled in the art, and I desire that it be understood therefore that I intend in the appended claims to cover all modifications which do not depart from the spirit and scope of this invention.

What is claimed is:

1. In a seed planter shoe: a forwardly extending vertical runner plate member; a pair of generally vertical rearwardly extending side plate members, said side plate members being rearwardly spaced apart and forwardly merging and respectively joined to opposite sides of said runner plate member, one of said side plate members being arranged to be substantially disposed above ground level, the other of said side plate members having a first portion arranged to be disposed substantially above ground level and a depending portion arranged to be disposed below ground level, said depending portion extending rearwardly from the point of junction with said runner plate member, said runner plate member extending rearwardly intermediate said side plate members and having a depending portion arranged to be disposed below ground level, said runner plate depending portion having its bottom edge extending deeper than the bottom edge of said side plate depending portion and having its rear edge extending further rearwardly than the rear edge of said side plate depending portion to form continuously a narrow deep furrow in said ground which closes rearwardly of said runner plate depending portion rear edge as said shoe moves forwardly; and a downwardly extending liquid fertilizer conduit positioned between and secured with respect to said side plates and having its upper end adapted to be connected to a source of liquid fertilizer, said conduit having its bottom end extending into said furrow with its exit orifice positoned intermediate the planes through said runner plate and side plate depending portion and substantially in the horizontal plane of the bottom edge of the side plate and rearwardly adjacent said rear edge of said runner plate depending portion to direct liquid fertilizer directly and solely into the bottom of said furrow forwardly of the closure thereof.

2. In a seed planter shoe: a forwardly extending vertical runner plate member; a pair of generally vertical rearwardly extending side plate members, said side plate members being rearwardly spaced apart and forwardly merging and respectively joined to opposite sides of said runner plate member, one of said side plate members being arranged to be substantially disposed above ground level, the other of said side plate members having a first portion arranged to be disposed substantially above ground level and a depending portion arranged to be disposed below ground level, said depending portion extending rearwardly from the point of junction with said runner plate member, said runner plate member extending rearwardly intermediate said side plate members and having a depending portion arranged to be disposed below ground level, said runner plate depending portion having its bottom edge extending deeper than the bottom edge of said side plate depending portion and having its rear edge extending further rearwardly than the rear edge of said side plate depending portion; a furrow forming member extending between said one side plate member and said runner plate depending portion and extending further rearwardly than said rear edge of said runner plate depending portion, said furrow forming member with said runner plate depending portion and said side plate depending portion continuously forming a narrow deep furrow in said ground which closes rearwardly of said furrow forming member as said shoe moves forwardly; and a downwardly extending liquid fertilizer conduit positioned between and secured with respect to said one side plate member and said runner plate portion and having its upper end adapted to be connected to a source of liquid fertilizer, said conduit having its bottom end extending into said furrow with an elbow formed thereon, said elbow having its exit orifice positioned intermediate the planes through said runner plate and side plate depending portion and intermediate said rear edge of said runner plate depending portion and the rear edge of said furrow forming member, said elbow further having its exit orifice directed forwardly and downwardly to direct liquid fertilizer directly and solely into the bottom of said furrow forwardly of the closure thereof.

References Cited in the file of this patent

UNITED STATES PATENTS

| | | |
|---|---|---|
| 1,837,895 | Chambers | Dec. 22, 1931 |
| 2,096,298 | Greenwell | Oct. 19, 1937 |
| 2,159,652 | Brunner | May 23, 1939 |
| 2,768,591 | James | Oct. 30, 1956 |
| 2,769,412 | Holle | Nov. 6, 1956 |